March 25, 1941.  E. B. TURNER  2,236,023

FISH LURE

Filed May 6, 1939

INVENTOR:
E. B. Turner
BY Robb & Robb
ATTORNEYS.

Patented Mar. 25, 1941

2,236,023

UNITED STATES PATENT OFFICE 2,236,023

FISH LURE

Edwin B. Turner, Wellington, Ohio

Application May 6, 1939, Serial No. 272,211

2 Claims. (Cl. 43—45)

This invention relates to a fish lure for use in trolling, and more particularly, to a fish lure of simplified construction which will operate in a desired manner when drawn through the water by a trolling line.

The practice of constructing fish lures of metal, in a manner to cause the lures to rotate when pulled through water by a trolling line, is well known. In such devices, the usual method is to provide depressed or projecting surfaces in the body of the lure against which the force of the water is directed when the lure is pulled through the water to thereby cause rotation of the body of the lure. The provision of such projecting or depressed surfaces has a tendency to cause the lure to ride flat on the surface of the water without rotating and thereby skim along the surface of the water. Moreover, the conventional types of fishing lure, constructed in the manner referred to, are disadvantageous in that they will not rotate effectively unless drawn through the water at a high rate of trolling speed.

The principal object of this invention is to provide a fish lure which will rotate or spin about its longitudinal axis when drawn through the water at low or high rates of trolling speeds.

A further object is to provide a fish lure having a substantially flat sheet-like body member which has been twisted about its longitudinal axis to provide a spirally curved surface which will effectively cause rotation of the body member about its longitudinal axis when drawn through the water by a trolling line.

A further object is to provide a fishing lure of the character referred to, wherein the tail portion of the lure is angularly offset with respect to the front portion, whereby the lure will move universally with respect to a point adjacent the front end of the lure.

A further object is to provide a fish lure with the front end constructed in a manner which will cause the lure to "bite" into the water and thereby prevent the lure from riding flat on the surface of the water.

Other objects and advantages of the invention will become apparent during the course of the following description.

Figure 1:
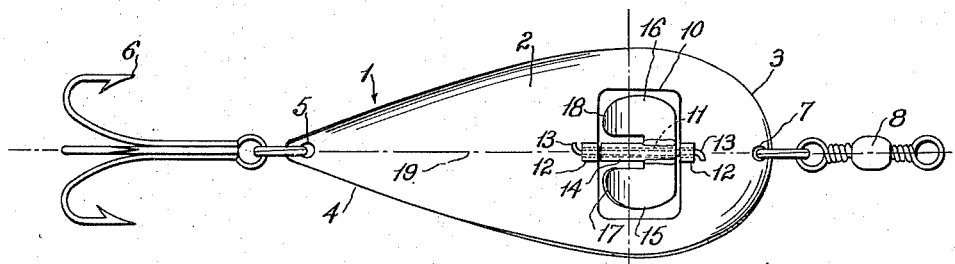
Figure 1 is a plan view of a fish lure constructed in accordance with the principles of this invention.

Referring to the drawing, the numeral 1 indicates as a whole a fish lure, having a substantially flat sheet-like body member 2 provided with an enlarged front end portion 3 and a tapered tail or rear end portion 4. The body member 2 is formed with a twist therein to provide a spirally curved surface in a manner and for a purpose to be described.

The body member 2 is further provided with an opening 5 in the tail end portion 4 thereof, in order that a fish hook 6 may be attached to the lure. The front end portion 3 is provided with an opening 7 for connecting the lure to a swivel 8 which in turn may be connected to a trolling line (not shown).

Figure 2:
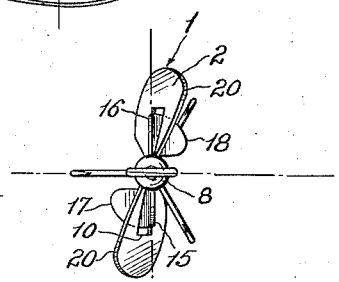
Figure 2 is a front end view of the lure shown in Figure 1, illustrating the curvature of the body of the lure.

An opening 10 is provided in the body member 2 and a supporting rod or member 11 is secured transversely thereof by lugs 12 rigidly secured to the body member 2. The ends 13 of the rod 11 are turned at an angle with respect to the rod 11 to prevent lengthwise sliding movement of the rod 11 and consequent disengagement thereof from the lugs 12. A sleeve 14 is rotatably mounted on the rod 11 and is provided with propeller devices or wings 15 and 16 rigidly secured thereto. As best shown in Figure 2, the propeller-like devices or wings 15 and 16 are provided with offset fins 17 and 18 which will be effective to cause rotation of the sleeve 14 and attached wings 15 and 16 with respect to the body member 2 when the body member 2 is drawn through the water.

Figure 3:
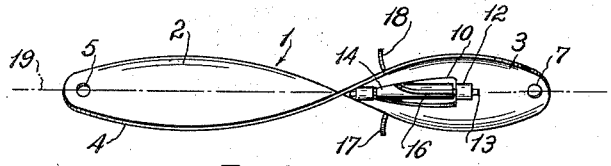
Figure 3 is a side view of the lure shown in Figure 1, and further illustrating the curvature of the body of the lure.

The swivel 8 permits rotation of the body member 2 with respect to the end of the trolling line to which the lure may be attached. In order that the lure 1 will be rotated as it is drawn through the water, the body member 2 is formed with a twist therein to provide a spiral curve on the surface of the body member 2. The deformation of the body member 2 is best shown in Figures 2 and 3. It will be apparent that such a twist will be imparted to the body member 2 by twisting the front end portion 3 and rear end portion 4 in opposite directions along the axis 19.

It will be apparent that by reason of the curved surfaces of the body member 2, the force of the water acting against such surfaces when the body member 2 is drawn through the water, will cause rotation of the body member 2 about the axis 19. Moreover, as best shown in Figure 2, the edge 20 of the front portion 3 will cause a "biting" action of the edge 20 with respect to the water, thereby preventing the body member 2 from riding flat on the surface of the water. In addition, the curvature of the body member 2 will cause rotation about the axis 19 at slow rates of trolling speed.

Figure 4:
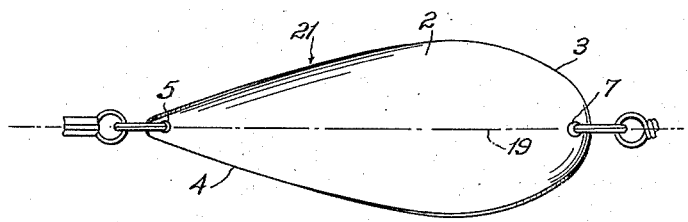
Figure 4 is a plan view of a modified form of the lure shown in Figure 1.
Figure 5:
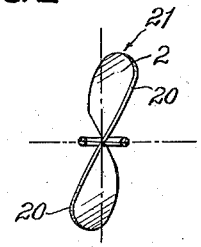
Figure 5 is a front-end view of the lure shown in Figure 4.

The modified form of lure, indicated as whole by the numeral 21, shown in Figures 4 and 5, is the same as that illustrated in Figures 1, 2 and 3, and the same numerals are used to designate like parts.

The difference in the construction of the lure 21 lies in the omission of the opening 10 and the associated rotatable elements 15 and 16 described in connection with the lure 1.

Figure 6:
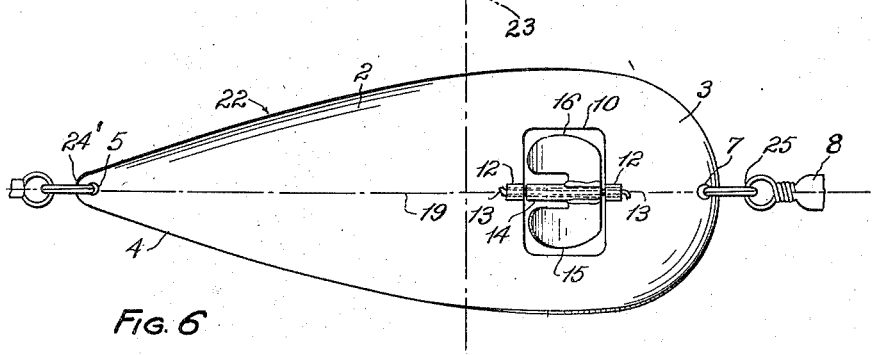
Figure 6 is a plan view of another modified form of the lure shown in Figure 1; and, Figure 7 is a side view of the lure shown in Figure 6.
Figure 7:
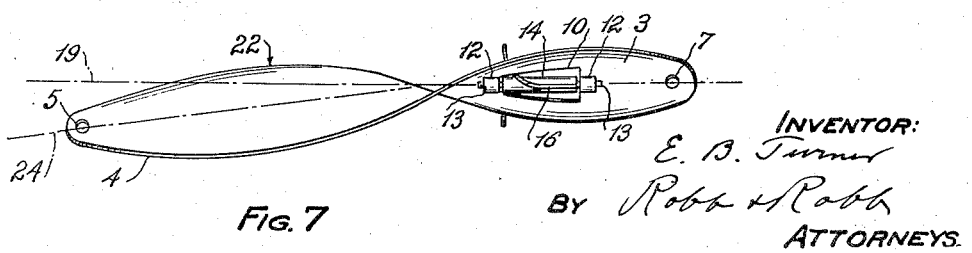

Likewise, the modified form of lure, indicated as a whole by the numeral 22, illustrated in Figures 6 and 7, is similar to the lure 1 already described, and the same numerals are used to designate like parts.

In addition to deforming the body member 2 of the lure 22 by twisting along the axis 19 in order that the lure will rotate about the axis 19 when drawn through the water, a further deformation is imparted to the body 2 of the lure 22. The additional deformation of the lure 22 consists in bending the tail portion 4 of the body member 2 about the line 23. This additional deformation causes the tail portion 4 to assume an angularly inclined position with respect to the front portion 3, as best shown in Figure 7. In Figure 7, an additional axis 24 is shown on the tail portion 4 in order to better illustrate the angular offset of the tail portion 4 with respect to the normal axis 19.

The angular inclination of the tail portion 4 on the lure 22 does not interfere with the rotation of the body member 2 caused by the spirally curved surface imparted thereto by the twisting movement along the line 19.

However, such angular inclination causes the rear point 24' of the tail portion 4 to move in a circular path with respect to an assumed point 25, adjacent the front end portion 3. That is, the path of the point 24', as the lure 22 is drawn through the water, will be in the nature of a spiral. The spiralling movement of the lure 22 through the water in addition to its rotating movement enhances the attractiveness of the lure 22.

The body member 2 in all the modifications shown is preferably painted or formed of a bright metal in order that it will flash as it is rotated when drawn through water. In the modifications shown in Figures 1 and 6, the sleeve 14 and wings 15 and 16 are also preferably colored brightly to provide an auxiliary flasher device mounted on the body member 2 which will rotate relative to the body member 2 when drawn through water. Accordingly, it will be apparent from the foregoing that the lure will provide a novel combination of flashing effects as it is drawn through water.

Having thus described my invention, what I claim as new and desire to secure by Letters Patent of the United States, is:

1. A fish lure comprising a substantially flat body member having front and rear end portions and a longitudinal axis extending between said end portions, said body member being twisted about said longitudinal axis to provide a spirally curved surface for effecting a spinning movement of said body member about said axis as the lure is drawn through water, said rear end portion being offset from said front end portion so that the longitudinal center line of said rear end portion will be angularly inclined with respect to the longitudinal center line of said front end portion whereby the lure will be caused to revolve bodily about an axis different from the axis of said spinning movement and while spinning movement of said lure is taking place.

2. A fish lure as claimed in claim 1, the front portion of which is broad at its spiral portion, and the rear end tapering as to its continuing spiral portion to its rear extremity.

EDWIN B. TURNER.